Feb. 3, 1931.  R. VON BROCKDORFF  1,791,254
MEANS FOR PREVENTING DEW FORMATION UPON
THE LENSES OF OPTICAL INSTRUMENTS
Filed Sept. 4, 1929
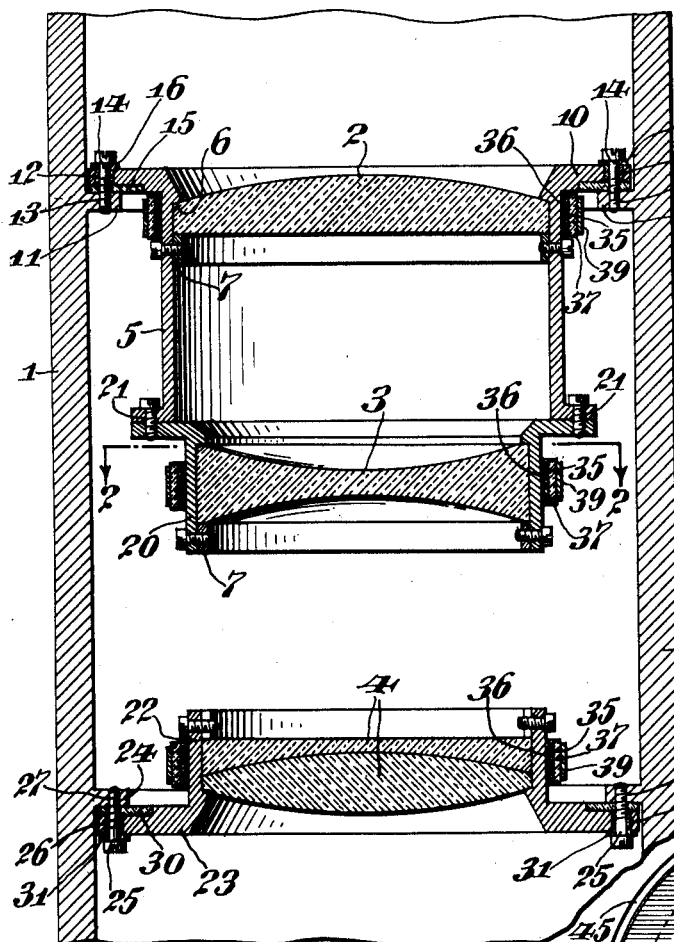
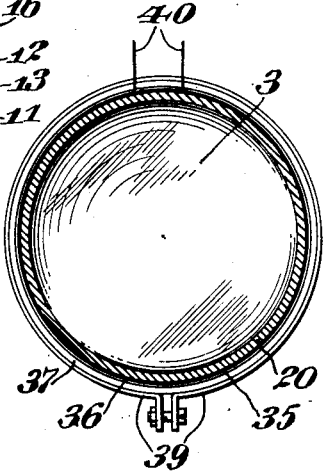
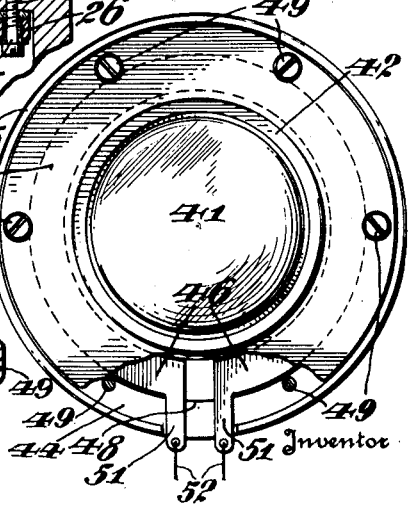
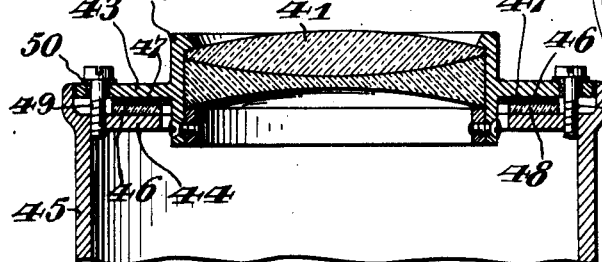

Patented Feb. 3, 1931

1,791,254

UNITED STATES PATENT OFFICE

RUDOLF VON BROCKDORFF, OF MUNICH, GERMANY, ASSIGNOR TO SCHUTTE AND KOERTING COMPANY, OF PHILADELPHIA, PENNSYLVANIA, A CORPORATION OF PENNSYLVANIA

MEANS FOR PREVENTING DEW FORMATION UPON THE LENSES OF OPTICAL INSTRUMENTS

Application filed September 4, 1929. Serial No. 390,244.

In the use of different optical instruments employing lenses, reflectors or the like, such, for example, as those employed for astronomical purposes, and periscopes used, for example, on submarines, it is desirable and even practically necessary that means be provided to prevent the deposition of moisture upon the lenses or reflectors. If some such means is not provided it will be found that frequently, due to the fact that the lenses or reflectors are at a temperature below that of the "dew point", moisture will be deposited upon the surfaces of the lenses, reflectors or the like, and prevent the proper functioning thereof. Such occurrence would be quite objectionable in connection with the making of astronomical observations, but if the optical device were in the form of a periscope and its proper functioning were prevented upon the projection of the periscope into position for use, such failure might prove very disastrous. The importance of means which is practical and which is effective in the preventing of the formation of moisture or dew upon the surfaces of the lenses or reflectors of optical instruments is quite obvious.

The object of the present invention is to provide means of novel construction and arrangement which is practical for maintaining the lens or reflector, as the case may be, at a temperature sufficiently high to prevent the formation of dew thereon in the use of an optical instrument.

It also is an object of the invention to provide means of novel construction for heating the holder for the lens, reflector or the like of an optical apparatus of the character indicated for maintaining the same at a temperature above that of the "dew point" and for preventing the dissipation of the heat of the heating means through the support for the holder.

Further objects of the invention will be pointed out in the subsequent portion of the specification or else will become apparent from the said portion.

In order that the invention may be readily understood and its practical advantages fully appreciated reference should be had to the accompanying drawing, wherein I have illustrated certain forms of embodiment thereof which at present are preferred by me, but it will be understood that the invention may be embodied in other forms of construction than those illustrated and that changes in the details of construction may be made within the scope of the claims without departing from the said invention or the principle thereof.

In the drawing,—

Fig. 1 is a view in central vertical section of a structure showing the invention employed for heating the objective lens structure of an astro-physical apparatus;

Fig. 2 is a transverse sectional view taken on the line 2—2 of Fig. 1;

Fig. 3 is a view showing a modified construction of the heating means; and

Fig. 4 is a top plan view of the structure shown in Fig. 3, a portion of the same being broken away to indicate more clearly certain details of construction.

Although I have shown in the drawing and shall describe a structure wherein electricity is employed as the heating means, yet it is to be understood that my invention in its broader aspects is not limited to the specific heating means employed. The essential fact of the invention is that the heat shall be applied preferably to the exterior of the holder of the lens, reflector or other optical element, and that the same shall be insulated from the supporting means for the holder to prevent unnecessary or too rapid dissipation of the heat.

In Figs. 1 and 2 of the drawing I have shown a support 1 which is hollow and preferably cylindrical, within which is supported a plurality of lenses separated or spaced from each other, each of which lenses is provided with means for heating the same to maintain the same at a temperature above the "dew point," that is, a temperature above that at which condensation of moisture from the air would take place when the latter contacts with the lenses.

In the construction as illustrated in Figs. 1 and 2 the lenses 2, 3, and 4 are supported in spaced relation to each other, the lenses 2 and 3 being in effect held by a common holder while the lens 4 is held by a separate holder.

The lens 2 is mounted within a cylindrical metal holder 5, which is provided at its upper end with an annular shoulder 6 against which the outer edge of the top side of the lens contacts. A band 7 secured upon the inside of the cylindrical holder 5 contacts with the outer edge of the under side of the lens 2 and retains the latter in position. The holder 5 is provided at its upper end with the laterally extending flange 10 which is supported upon a flange 11 which extends inwardly from the main support 1. The flanges 10 and 11 are provided respectively with openings 12 and 13, only two of each of which are shown. Fastening bolts 14 extend through these holes and have screw-threaded engagement with the holes 13 in the flange 11. A flat ring 15 of heat-insulating material of any suitable composition or material is interposed between the flange 10 and the flange 11, whereby the two are held in spaced relation to each other. The fastening bolts 14 are also insulated from the flange 10 and the holder 5 by means of bushings 16 of insulating material. These bushings and the ring 15 may be not only heat-insulating but also electrically insulating. The lens 3 is supported in a cylindrical holder 20 which is secured to the lower end of the cylindrical holder 5 in the manner as indicated at 21. A cylindrical holder 22 is provided for holding the lens 4 which comprises two lens elements, as shown. The said holder 22 is provided at its lower end with a laterally extending annular flange 23 which is supported upon an annular flange 24 which projects inwardly from the inner side of the main support 1. For securing the holder 22 upon the flange 24 holding bolts 25 are provided which extend through openings 26 in the flange 23 and openings 27 in the flange 24, with which latter openings the said bolts have screw-threaded engagement. The flange 23 is separated from the flange 24 by means of a flat band of heat insulating material 30. The said band may be both heat-insulating and electrically insulating. The bolts also are insulated from the holder 22 by means of bushings 31 of insulating material located in the openings 26.

Similar means for heating the respective lenses 2, 3 and 4 are employed; hence but one of the said means will be referred to specifically, namely, that at the top of Fig. 1. The reference numbers employed, however, will be applied to the corresponding parts of the heating means which are located in cooperative relation to the respective lenses. The said respective heating means comprises a resistance element 35, which is in the form of a band and consists of material of suitable character which offers the requisite resistance to the flow of electric current therethrough, so that upon the placing of the same in a closed electric circuit it becomes heated. The resistance element may be of any other form which may be preferred. The said element is insulated electrically from the holder of the lens with which it may be associated by a band 36 of suitable insulating material, which may consist, for example, of mica, lacquer or the like. A band 37 of suitable heat-insulating material is located upon the outer side of the band 35 and all of the said bands 35, 36 and 37 are held in place by the outer metal clamping band 39. The band 37 also may be electrically insulating. Portions of the electric current conductors for supplying electric current to the resistance element 35 are shown at 40 in Fig. 2. By providing the heat-insulating band 37 in connection with each of the heating units dissipation of the heat through the clamping metallic band 39 is prevented. Also by providing the heat-insulating flat bands 15 and 30, to which reference has been made, conduction of heat from the holders 5 and 22 to the main supporting part 1 of the structure is prevented. By thus providing heat-insulating means between the lens holders and the support for the said holders the amount of electric energy required for maintaining the lenses at a temperature above the "dew point" is substantially reduced.

In the construction as illustrated it is found that small amounts of electrical energy are required, the amount ranging from about 20 watts to 100 watts for each apparatus. By reason of the low voltage (generally not exceeding 2 volts) and small amount of electrical energy required there is no difficulty in the matter of insulating the current-carrying parts of the structure from each other or from other portions thereof.

In Figs. 3 and 4 of the drawing I have shown a slightly modified construction wherein the lens 41, comprising two lens elements as shown, is mounted in a holder 42 which is provided with an annuluar flange 43 which is supported upon a flange 44 which projects inwardly from the cylindrical support 45. Interposed between the flange 43 and the flange 44 is a heating element 46 consisting of a horizontally arranged flat band of suitable electric current resisting material. The said band extends or is located in a plane extending at right angles to the axis of the lens 41 and the support 45. The electric current resistance element 46 is insulated from the flange 43 by a very thin band or layer 47 of electric insulating material, which may consist of mica, lacquer or the like. The said resistance element 46, as well as the flange 43, is separated from the flange 44 by a band 48 of suitable heat-insulating material, which preferably also should be electrically insulating. The holder 42 is held upon the support 45 by means of holding bolts 49 which are insulated from the flange 43 by means of bushings 50 of heat-insulating material. The said material also may be electrically insulating. The adjoining opposing ends of the flat band 46 which constitutes the heating element are provided with outwardly extending projections 51 to which the electrical conductors 52 are connected.

It will be understood that in the operation of the device the circuit including either heating elements 35 (of the structure shown in Figs. 1 and 2) or the circuit including the heating element 47 (of the structure shown in Figs. 3 and 4) is closed, so that electric current flows trough the said heating elements to effect heating thereof. The current used should be sufficient to supply the amount of energy necessary to effect the requisite heating of the optical elements to prevent the condensation thereon of moisture from the air when the latter contacts with said elements. Any known means, not shown, such as a rheostat, may be employed for controlling the amount of current which may flow through the circuits of the said heating elements to thereby regulate and control the temperature to which the optical elements may be raised.

The material of the heating elements above referred to may consist of an alloy of nickel and chromium or any other suitable substance, as indicated.

It will be seen that I have provided a simple construction of means whereby the optical elements, being the glass lenses of the structure as illustrated, may be heated and maintained at a temperature sufficient to prevent the formation upon the surface thereof of moisture condensed from the air.

Having thus described my invention, what I claim and desire to secure by Letters Patent is:

1. Means for preventing the deposition of moisture of the air upon the optical elements of optical instruments, comprising a holder for an optical element, a support for the said holder, means for heating said holder, and heat insulating means interposed between the said holder and the said support.

2. Means for preventing the formation of dew upon the optical elements of optical instruments, comprising a holder for an optical element, a support for the said holder, the said holder being located within said support, heating means supported upon the said holder for heating the latter to a temperature higher than that of the temperature of the "dew point", and heat insulating means interposed between the said holder and the support therefor.

3. Means for preventing the deposition of moisture from the air upon the surfaces of the optical elements of optical instruments, comprising a holder for an optical element, a support for said holder within which the said holder is located, heating means supported upon and exteriorly of said holder for heating the latter to a temperature above "dew point" temperature, and heat insulating means interposed between the said holder and its support.

4. Means for preventing the deposition of moisture from the air upon the surfaces of the optical elements of optical instruments, comprising a holder for an optical element, a support for said holder, electric heating means supported upon said holder, electric insulating means interposed between the electric heating means and the said holder, and heat insulating means interposed between the said holder and the support therefor.

5. Means for preventing the deposition of moisture from the air upon the surfaces of the optical elements of optical instruments, comprising a holder for an optical device, a support for said holder, an electric current resistance element mounted upon and exteriorly of the said holder, electric insulating means interposed between the said resistance element and the said holder, and heat insulating means interposed between the said holder and the support therefor.

6. Means for preventing the deposition of moisture from the air upon the surfaces of the optical elements of optical instruments, comprising a holder for an optical element, an electric current resistance element consisting of a flat band extending around the said holder, a band of electric insulating material interposed between the said electric current resistance band and the said holder, a band of heat insulating means extending around and in contact with the said current resistance element, and heat insulating means interposed between the said holder and the support therefor.

7. Means for preventing the deposition of moisture from the air upon the surfaces of the optical elements of optical instruments, comprising a holder for an optical element, a support for said holder, a flat band of electric current resistance material supported upon said holder and extending around the same in adjoining relation to the points thereon at which the said optical element is supported, electric insulating material interposed between the said band and the said holder, heat insulating material located upon the outside of and inclosing the said band of resistance material, a metal clamping band extending around the heat-insulating band and retaining the same together with the resistance element and the electric insulating means upon the said holder, and heat insulating means interposed between the said holder and the support therefor.

In testimony that I claim the foregoing as my invention, I have hereunto signed my name this 12th day of July, A. D. 1929.

RUDOLF von BROCKDORFF.